Patented Mar. 12, 1940

2,193,636

UNITED STATES PATENT OFFICE 2,193,636

PRESERVATION OF FRUIT

Albert E. Marshall, New York, N. Y., assignor to Tolco, Incorporated, Toledo, Ohio, a corporation of Ohio No Drawing. Application August 15, 1938, Serial No. 224,952

5 Claims. (Cl. 99—156)

The invention relates to the preservation of fruit, such as apples, pears, oranges, lemons and grapefruit, by means of a betaine iodide.

The principal object of the invention is the protection of fruit for extended periods against attack by molds. More specific objects and advantages are apparent from the description, which merely discloses and illustrates the invention and is not intended to impose limitations upon the claims.

In accordance with the invention, fruit is protected against mold growth by the use of a betaine iodide, such as betaine hydrogen iodide or basic betaine iodide. The betaine iodide gives off iodine vapor, the evolution of the vapor being much slower than its evolution from free iodine.

Although a solution of a betaine iodide may be applied to the surface of the fruit as a disinfectant, the preferred method of protecting the fruit is to expose the air that comes in contact with the fruit to the betaine iodide. It is preferable to contact the air with absorbent organic material impregnated with the betaine iodide. Iodine vapor is believed to be evolved more rapidly from the betaine iodide when it is in contact with organic material, but the evolution is in any case much slower than from free iodine. Air may be passed through absorbent organic material impregnated with the betaine iodide and then through a storage compartment filled with fruit, but the betaine iodide is preferably used by impregnating therewith the paper in which the individual fruits are to be wrapped. Unwrapped fruit may be packed in impregnated wood shavings or the like, but impregnated paper wraps are more satisfactory.

When wraps impregnated with free iodine are employed the iodine vaporizes too rapidly. If only minute quantities of iodine are used to impregnate the wraps, the iodine soon disappears and its preserving effect is only temporary. The use of larger quantities of iodine for impregnation prolongs the protection against molds but produces excessive concentrations of iodine vapor that taint the fruit so as to render it unsafe for use as food.

Example 1

One-third pound of betaine hydrogen iodide is dissolved in 100 gallons of water at ordinary temperatures, and apples are dipped in the solution shortly after being picked. Before the apples are packed they are exposed to air at normal temperatures so that the film of solution on each fruit can evaporate.

Example 2

Paper wraps for oranges are immersed in a 5 per cent solution of basic betaine iodide in water. The wraps are permitted to dry before they are used.

Various embodiments of the invention may be devised to meet various requirements.

Having described my invention, I claim:

1. A method of preserving fruit that comprises exposing air that comes in contact with the fruit to a betaine iodide.

2. A method of preserving fruit that comprises treating the surface of the fruit with a betaine iodide.

3. A method of preserving fruit that comprises exposing air that comes in contact with the fruit to absorbent organic material impregnated with a betaine iodide.

4. A method of preserving fruit that comprises wrapping the fruit in paper that has been impregnated with a betaine iodide.

5. A paper fruit wrap that has been impregnated with a betaine iodide.

ALBERT E. MARSHALL.